(12) United States Patent
Delgado et al.

(10) Patent No.: US 8,807,976 B1
(45) Date of Patent: Aug. 19, 2014

(54) TIRE BEAD AREA ROTATION APPARATUS

(71) Applicant: The Goodyear Tire & Rubber Company, Akron, OH (US)

(72) Inventors: Andres Ignacio Delgado, Medina, OH (US); Eugene Andrew Bator, Diamond, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/776,903

(22) Filed: Feb. 26, 2013

Related U.S. Application Data

(60) Provisional application No. 61/700,488, filed on Sep. 13, 2012.

(51) Int. Cl.
  *B29D 30/06* (2006.01)

(52) U.S. Cl.
  USPC ............... 425/28.1; 156/398; 425/36; 425/38

(58) Field of Classification Search
  USPC .............................. 425/28.1, 36, 38; 156/398
  See application file for complete search history.

(56) References Cited

U.S. PATENT DOCUMENTS

| | | | |
|---|---|---|---|
| 1,579,922 A * | 4/1926 | Gammeter | 156/135 |
| 2,812,546 A | 11/1957 | Soderquist | |
| 3,153,263 A | 10/1964 | Mallory et al. | |
| 3,378,882 A | 4/1968 | Turk et al. | |
| 3,659,975 A | 5/1972 | Leblond | |
| 3,824,048 A * | 7/1974 | Getz | 425/28.1 |
| 3,948,591 A | 4/1976 | Kratochvil et al. | |
| 4,236,883 A * | 12/1980 | Turk et al. | 425/36 |
| 4,304,619 A | 12/1981 | Riggs | |
| 4,338,069 A | 7/1982 | Singh et al. | |
| 4,447,385 A | 5/1984 | Blosser et al. | |
| 4,449,903 A | 5/1984 | Hasegawa et al. | |
| 4,472,125 A | 9/1984 | Kubo et al. | |
| 4,474,399 A | 10/1984 | Lauber | |
| 4,545,750 A | 10/1985 | Sarumaru | |
| 4,606,714 A | 8/1986 | Nixon et al. | |
| 4,608,219 A | 8/1986 | Singh et al. | |
| 4,618,320 A | 10/1986 | Singh | |
| 4,725,212 A | 2/1988 | Singh | |

(Continued)

FOREIGN PATENT DOCUMENTS

| | | |
|---|---|---|
| DE | 117200A1 A1 | 5/1976 |
| WO | WO03018301 A1 | 3/2003 |
| WO | WO2005046975 A1 | 5/2005 |

OTHER PUBLICATIONS

U.S. Appl. No. 13/773,035, filed Feb. 21, 2013.

*Primary Examiner* — James Mackey
(74) *Attorney, Agent, or Firm* — June E. Rickey

(57) ABSTRACT

Disclosed is a machine for rotation of the bead area of a green tire so that the bead areas are parallel and concentric in order to remove potential anomalies that can occur to a green tire bead portion during pre-cure handling, storing or during shaping in the tire press. The tire apparatus orients the beads of the green tire parallel and square to one another and also rotates the bead area of the tire into the proper configuration prior to cure. The bead portions of the tire maintain the parallel position as the tire is loaded into a tire mold. Also disclosed is a tire loader that has a bead support ring and paddles to grip the outer crown portion of the tire.

15 Claims, 10 Drawing Sheets

(56) References Cited

U.S. PATENT DOCUMENTS

| | | |
|---|---|---|
| 4,768,764 A | 9/1988 | Cole |
| 4,865,532 A | 9/1989 | Frerichs et al. |
| 4,874,303 A | 10/1989 | Ichikawa et al. |
| 5,034,079 A * | 7/1991 | Rach et al. ............. 425/36 |
| 5,127,811 A * | 7/1992 | Trethowan ............. 425/36 |
| 6,092,575 A | 7/2000 | Drieux et al. |
| 6,238,193 B1 | 5/2001 | Bosseaux |
| 6,277,317 B1 * | 8/2001 | Vannan et al. ............. 425/36 |
| 6,702,977 B2 | 3/2004 | Girard et al. |
| 7,442,335 B2 | 10/2008 | Cole |
| 7,740,788 B2 * | 6/2010 | Yoshino et al. ............. 425/36 |
| 2007/0023966 A1 | 2/2007 | Girard et al. |
| 2009/0211695 A1 * | 8/2009 | Marchini et al. ............. 425/38 |

* cited by examiner

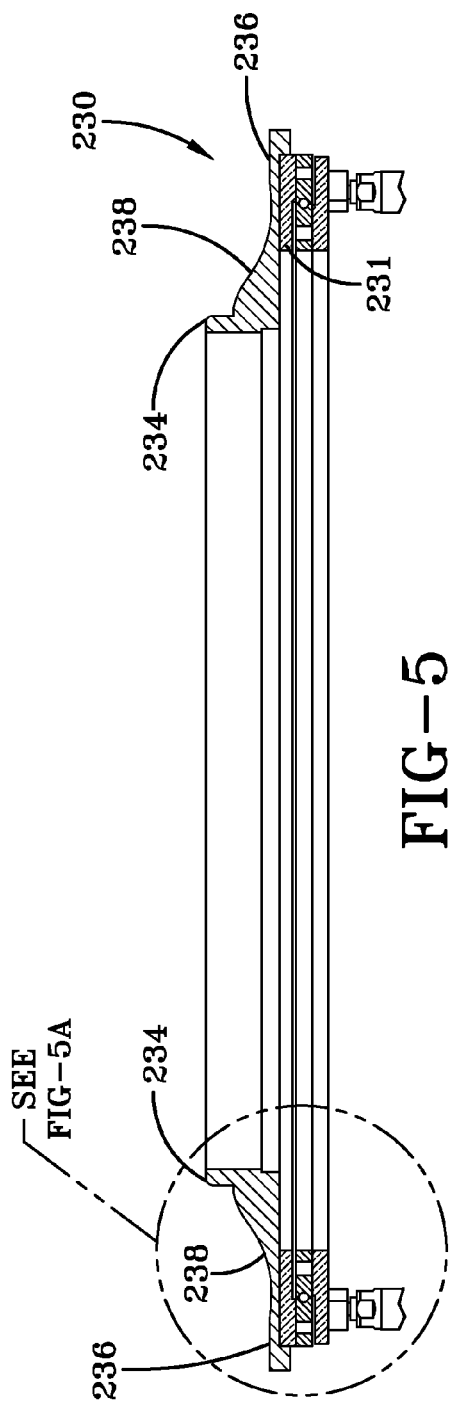
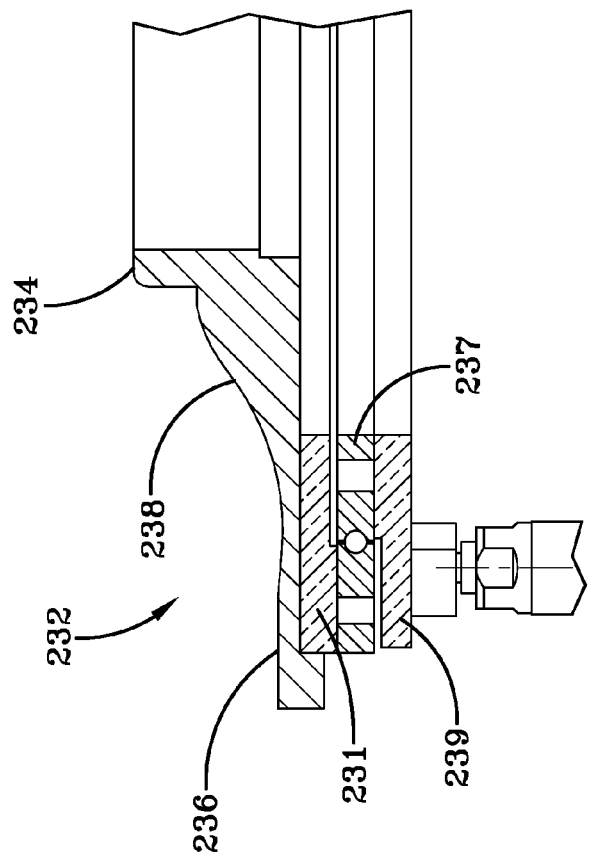
FIG-5
FIG-5A

TIRE BEAD AREA ROTATION APPARATUS

FIELD OF THE INVENTION

The present invention is directed to tires and tire machinery. More particularly, the present invention is directed to a machine that reduces nonuniformities of a green tire.

BACKGROUND OF THE INVENTION

Tire uniformity is important to overall performance. Nonuniformities may occur during the tire building process, green tire storage, or during loading and shaping of the green tire into the tire press prior to curing. One aspect of tire nonuniformity is when the opposed tire beads are not concentric and parallel to each other. As shown in FIG. 1, a prior art green tire loader grasps the tire from the top bead and positions the lower bead onto a bottom mold bead ring in the press. Next, the top bead is released without control of its location relative to the bottom bead, or the top mold bead ring. One problem with the prior art loader is that the lower sidewall bead region has not been rotated into cured position prior to engagement with the tapered bottom bead ring, and the loader is incapable of improving this undesirable condition. A second problem is that the green tire may or may not be centered on the loader or the bottom bead ring in the mold. A third problem is that the prior art tire loader has no means to accurately hold the top bead of the green tire concentric or parallel to the bottom bead.

FIG. 2a illustrates a green tire having a bead seated on the bottom mold bead ring 12 prior to shaping and with the mold in the open position. At this point, dimension X is equal to dimension Y. As shown, the lower sidewall bead region 14a is constrained by the bottom mold bead ring 12, while the top sidewall bead region 14b is unconstrained. FIG. 2b illustrates the green tire during shaping of the curing bladder. FIG. 2b also illustrates that the lower ply endings A near the bottom mold bead ring are trapped between the bladder and the tapered bottom mold bead ring, thus severely restricting the lower sidewall area from rotating into the proper position. During bladder shaping the mold is not closed allowing the upper bead area to be unrestrained. As the shaping pressure increases, the upper ply endings B are pulled back around the bead resulting in an increase in the Y dimension. The increase in the Y dimension also causes the centerline of the tire to shift laterally from the desired centerline a distance L, further causing conicity. Thus as shown in FIG. 2b, dimension Y is greater than X resulting in tire non-uniformity. When the press closes, the top mold bead ring engages the top bead, and forces the material in the top bead area to rotate around the top bead. The non-uniformity of material rotation around the top bead is similar to that of the bottom bead. Closing of the curing press does not solve the issues described above, and a tire with non-uniformity issues may still be cured.

It is thus desired to provide an improved apparatus for preforming the green tire prior to entry into the mold to ensure that the tire beads are concentric and parallel to each other. It is further desired to provide an improved apparatus that ensures the top and bottom bead areas are rotated into the proper cured position prior to placement into the tire mold and when loaded into the mold.

SUMMARY OF THE INVENTION

The invention provides in a first aspect a green tire preformer apparatus for rotating the bead areas of the tire into alignment with respect to each other, the green tire preformer apparatus includes a first support having a first bead ring to support a first tire bead area of a green tire, the green tire having opposing first and second tire bead areas, and a second support having a second bead ring positionable for engagement with the second tire bead area; and first and second rotatable bead clamps, wherein the first and second rotatable bead clamps are positioned to clamp the first and second bead areas into engagement with the first and second bead rings, respectively. The invention provides in a second aspect, a tire loader that has had a bead support ring and paddles to grip the outer crown portion of the tire.

BRIEF DESCRIPTION OF THE DRAWINGS

The invention will be described by way of example and with reference to the accompanying drawings in which:

FIGS. 5 and 5a are cross sectional views of the bottom mold bead ring support with translating support ring;

DETAILED DESCRIPTION OF THE INVENTION

Figure 1:
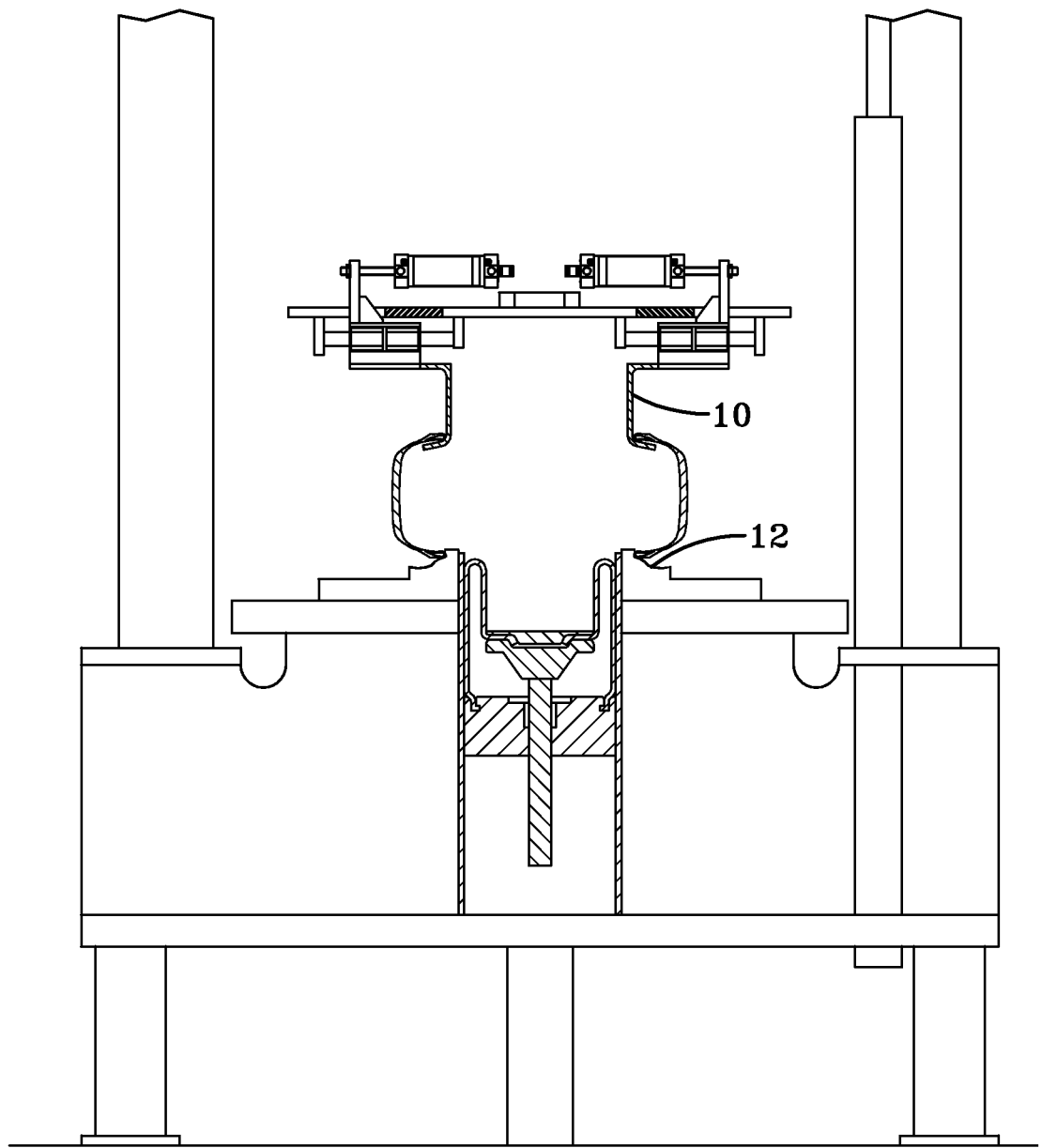
FIG. 1 illustrates a prior art loader loading a green tire into a tire press.
Figure 2:
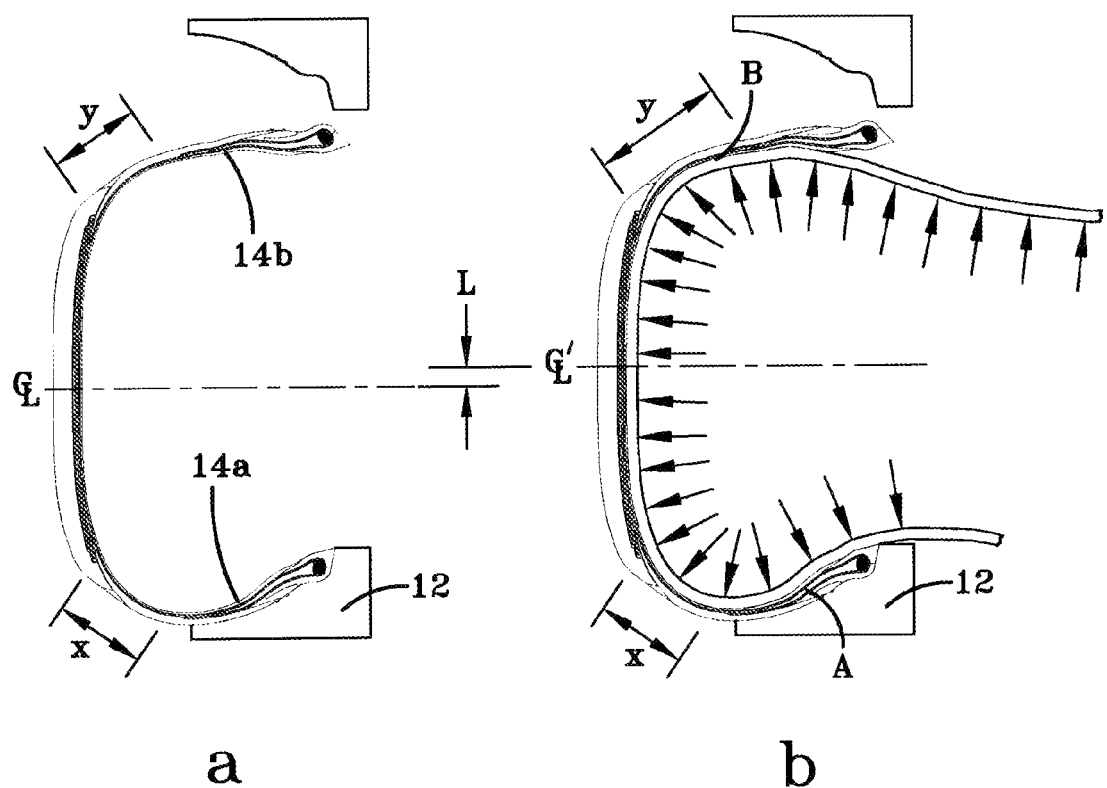
FIG. 2a is a cross sectional view of a green tire partially mounted on the bottom mold bead ring prior to engagement of the shaping bladder and mold closing.
FIG. 2b is a cross sectional view of a green tire partially mounted and shaped on the bottom bead ring of the tire mold during bladder shaping.
Figure 3:
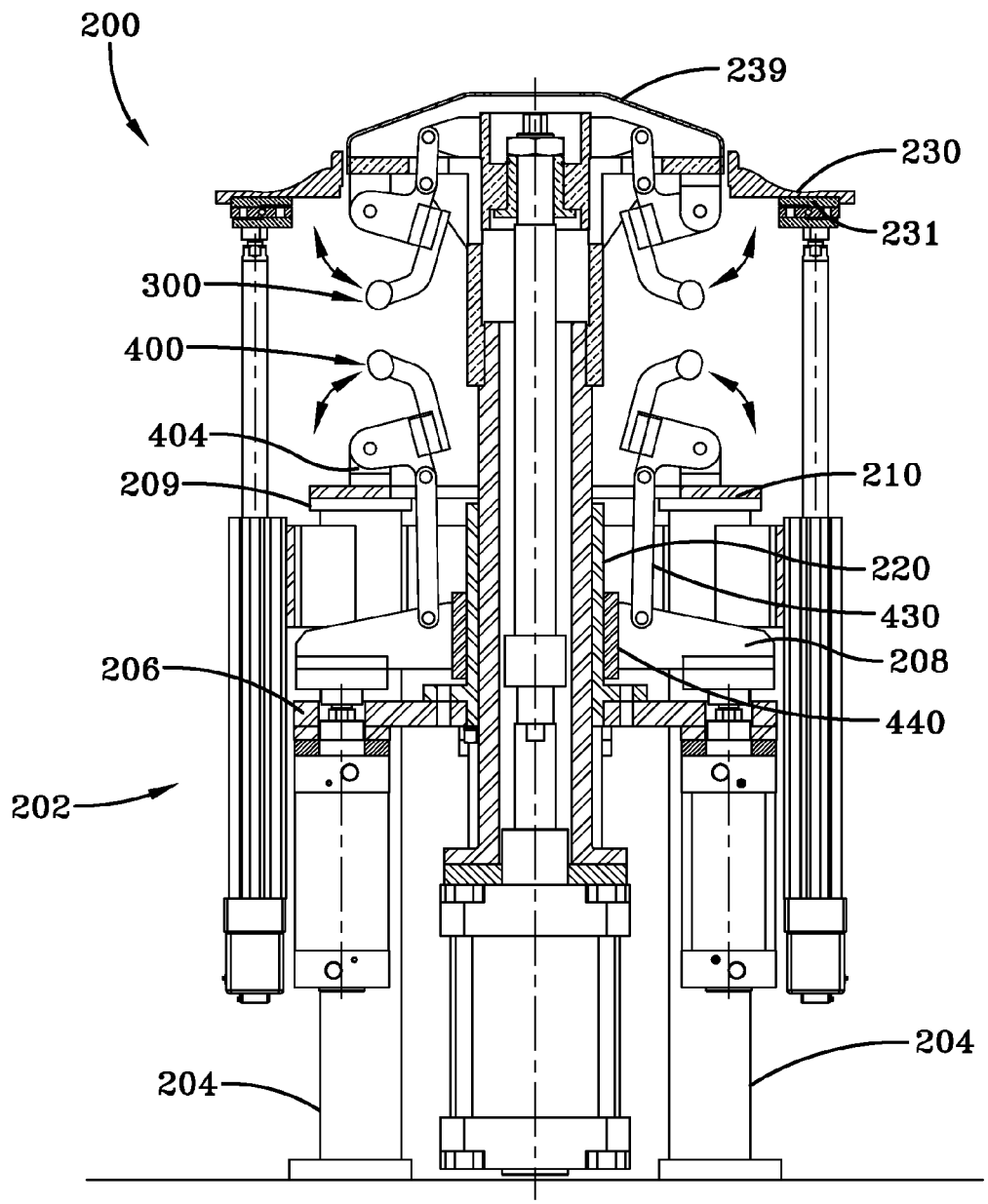
FIG. 3 is a cross sectional front view of a green tire preformer of the present invention shown in the start position without a green tire.

FIG. 3 illustrates a green tire pre-former apparatus 200 of the present invention. The green tire pre-former apparatus 200 is useful for pre-forming a green tire so that the overall tire shape matches the cured tire shape, and the tire beads are concentric and parallel with respect to each other prior to entry into the mold. The tire pre-former apparatus 200 comprises a support frame 202 that has three or more support legs 204 joined together by a stationary lower support plate 206. An annular center support outer column 220 extends vertically upwards from the support plate 206 guiding center support inner column 222. A lower spider ring 208 is slidably mounted on center support outer column 220. Support frame 202 further comprises a stationary upper support plate 210 that is connected to the lower support plate via a plurality of support frame columns 209.

The green tire pre-former apparatus 200 further comprises a lower bead support ring 230. The lower bead support ring 230 is shown in FIG. 3 in a raised position suitable for loading the green tire onto the pre-former apparatus. As best shown in FIG. 5a, the lower bead support ring 230 has a lower surface mounted to an upper ring 231. The upper ring may be optionally connected to a rotatable bearing 237 so that the upper ring is free to rotate. The rotatable bearing 237 is connected to a bearing support plate 239. The lower surface of the bearing support plate 239 is mounted to a distal end 232 of a translating rod 235. Thus the lower bead support ring may be raised and lowered via translating rods 235, and may also be rotated radially around the center column via rotatable bearing ring 237. A gear rack 243 is positioned for engagement with the rotatable bearing ring 237 in order to precisely position the lower bead support ring 230. A programmable rotation-positioning device 244 may optionally be used to position the rotatable bearing ring 237.

Figure 4:
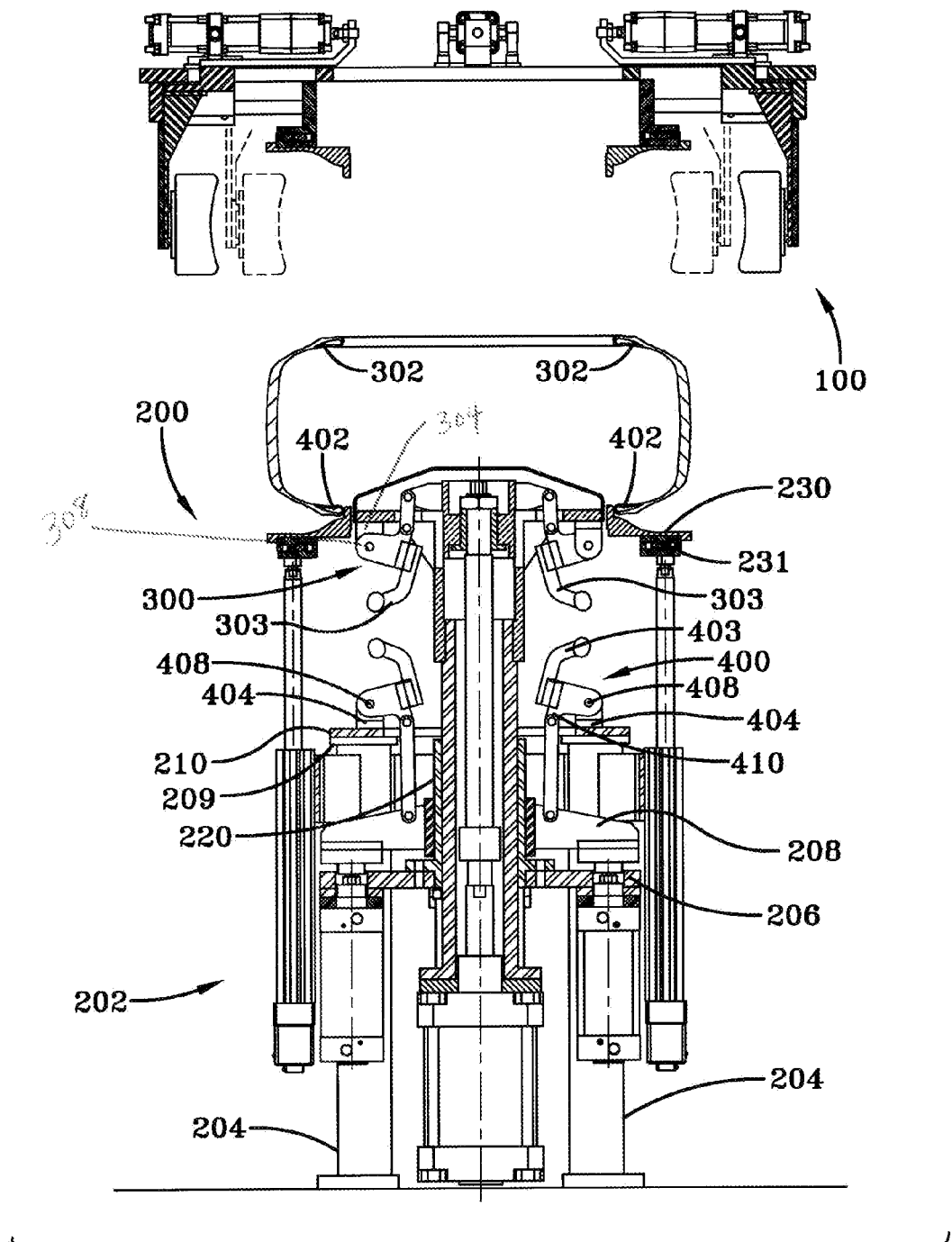
FIG. 4 is a cross sectional front view of a green tire preformer of the present invention shown in the start position with a green tire and green tire loader.

The lower bead support ring 230 as shown in FIG. 5A has a bead support 232 extending radially outward from the support ring 230. The bead support 232 has an annular lip 234 located axially inward of the bead support. The annular lip is straight and has no taper. The bead support has a flat portion 236 located axially outward on the support ring. The bead support 232 further comprises an angled seat 238 that joins the annual lip 234 to the flat portion 236. The angled seat 238 helps cam over the bead area material into the proper cured alignment position. The green tire pre-former apparatus 200 further comprises a top hat 245 which facilitates the proper centering of the green tire bead and tire onto the lower bead support ring of the green tire pre-former apparatus. FIG. 4 illustrates a green tire loaded onto the green tire pre-former apparatus with support ring 231 in the raised position with the lower sidewall bead area of the green tire in mating engagement with the lower bead support ring 230.

Figure 6:
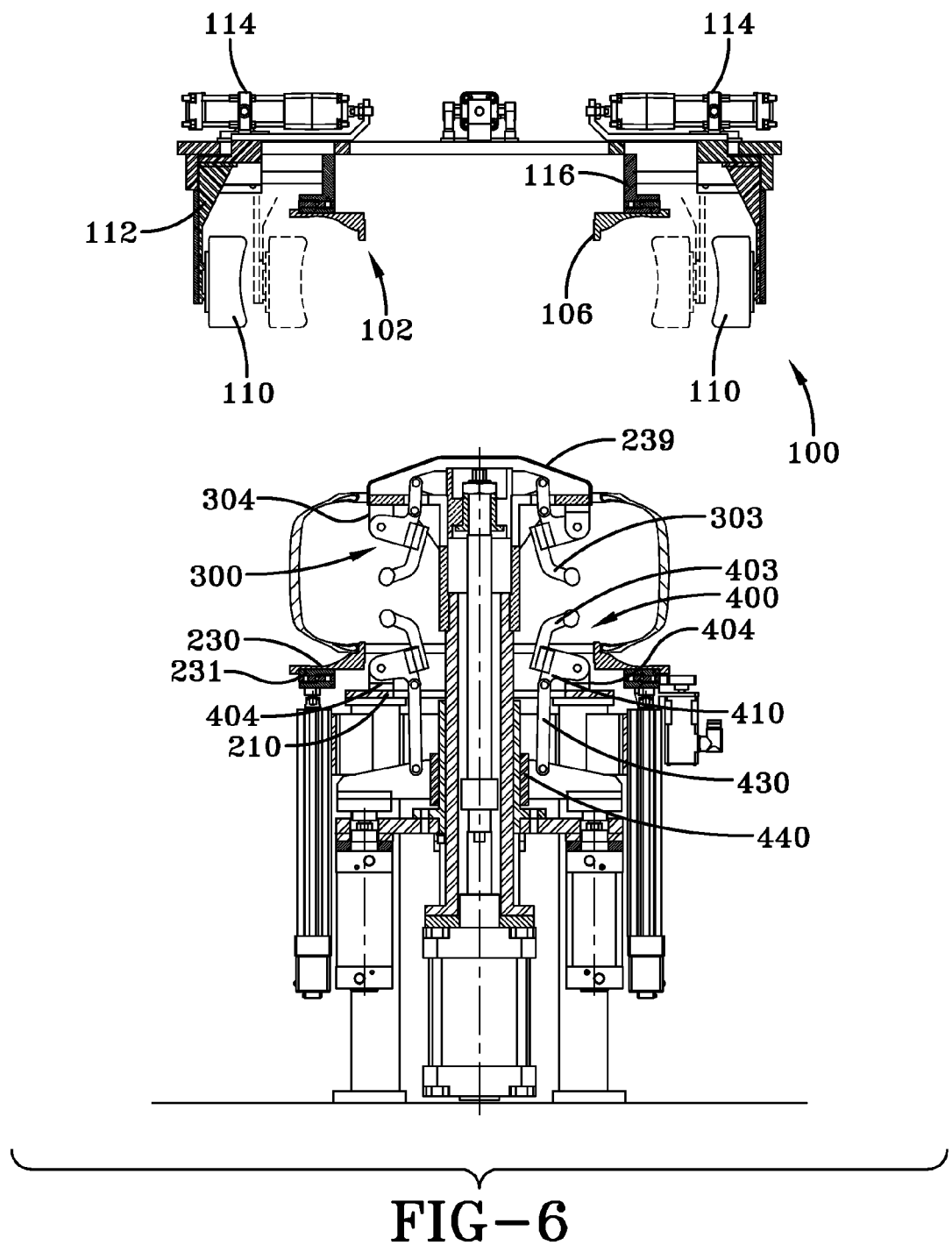
FIG. 6 is a cross sectional front view of a green tire preformer of the present invention shown in the loaded and lowered position with a green tire and green tire loader.
Figure 7:
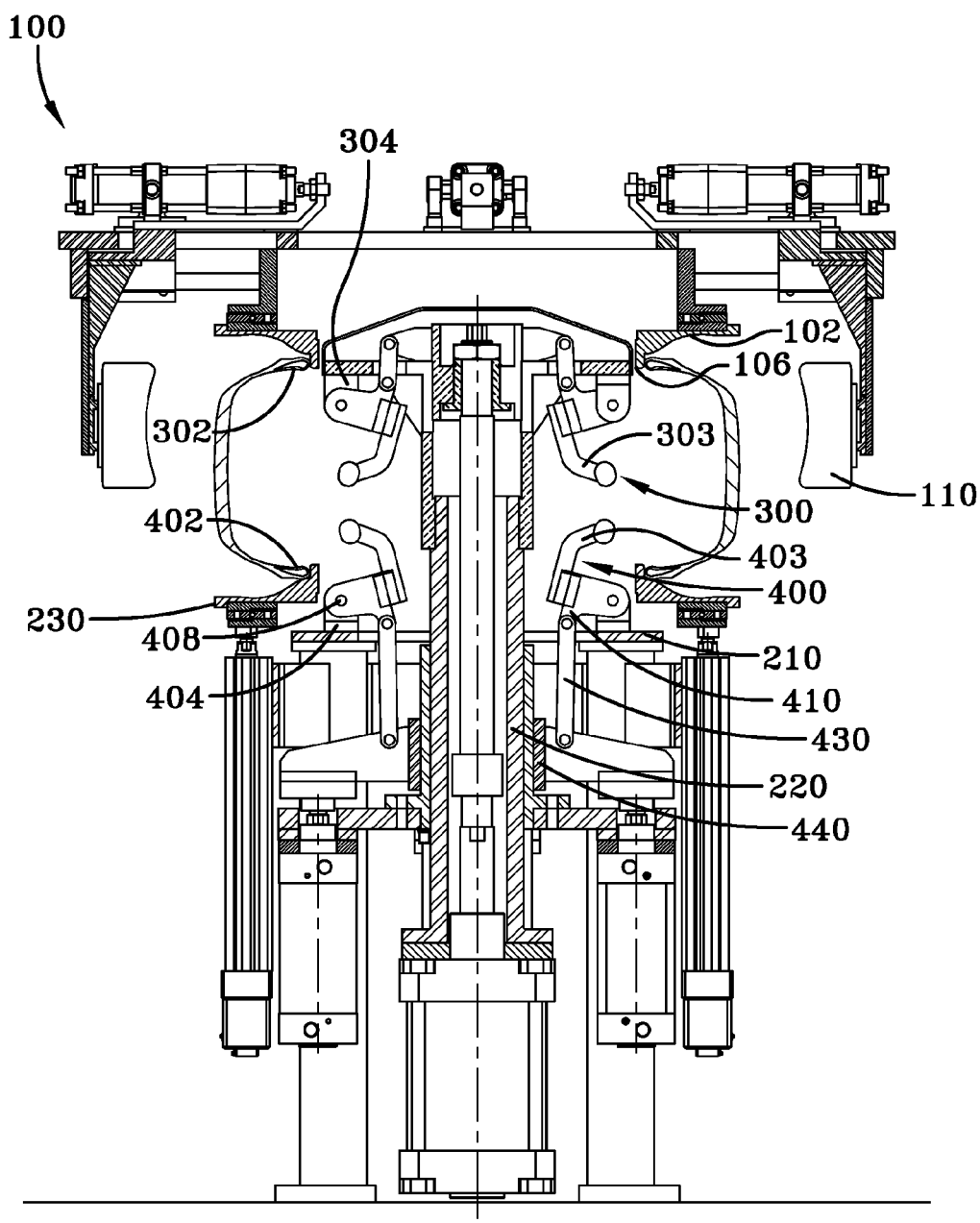
FIG. 7 is a cross sectional front view of a green tire preformer of the present invention shown with the loader upper mold bead support ring engaging the top bead of the green tire prior to the material rotation around the beads.

After the green tire has been lowered on the green tire pre-former apparatus 200 as shown in FIG. 6, the green tire loader 100 is lowered into the support/grasp position around the green tire as shown in FIG. 7. The green tire loader 100 includes an upper support ring 102 for engaging and supporting the upper bead of the green tire. The upper support ring 102 may optionally be rotatable, as described in more detail, below. The loader 100 with a rotatably mounted upper support ring 102 is lowered until the inner radial lip 106 of the upper bead support ring 102 engages the top bead of the green tire. The green tire loader further includes a plurality of tire engaging paddles or chucks 110. Each tire chuck is independently radially movable on a rail support 112 connected to a pneumatically driven piston 114. Each chuck is lockable at its own unique tread radius position thus holding and maintaining the concentricity of the top tire bead to the top bead lip ring 102. FIG. 6 shows the upper bead support ring 102 mounted on a support structure 116 in order to stabilize the support ring, facilitate bead size, provide for ring size changes, and position the support ring 102 adjacent to the tire engaging chucks 110.

As shown in FIG. 7, the green tire pre-former device further comprises upper and lower bead clamps, 300 and 400, which rotate and engage the inner tire bead area 302 and 402, thus causing the green tire bead area components 302 and 402 to rotate around the upper and lower bead support rings 230, 102 (including their angled seats 238, and their straight, non-tapered annular lips 234, 106) until the inner tire bead areas 302, 402 are held securely against the flat areas 236. The bead area components are able to rotate around the bead ring because the support rings 102,230 have no tapered lips which prevent the rotation. The bead area components 302,402 are the tire components that are rotated around the bead ring, which include the rim strip, inner liner, apex, the ply, and typically the lower sidewall below the turnup. Depending on tire design, other components around the bead area will also be rotated.

A plurality of upper and lower bead clamps 300, 400 are arranged in an annular fashion and are positionable to engage the tire bead area components 302,402. The upper and lower bead clamps 300,400 may each comprise at least eight equally spaced rotatable bead clamps. The bead clamps 300, 400 include curved or L shaped fingers that are adjustable in length, and function to grip the tire bead area components 302, 402 into engagement with the support rings 102, 230. The fingers may be articulable. The bead clamps 300,400 are pneumatically actuated in multiple partial steps, performed sequentially that ultimately result in the complete uniform rotation of the tire bead area components 302, 402 into engagement with the flat areas 236 of the bead support rings 102,230. The bead clamps are pivotally mounted to support flanges 304 and 404. The lower bead clamps 400 are positioned in an annular arrangement adjacent to the lower bead ring 230. The lower bead clamps rotate about pin 408 of flange 404. The upper bead clamps rotate about pin 308 of flange 304. Flanges 404 are mounted to the support plate 210 of the tire pre-former. The lower bead clamps include a bead clamp pivot 410 having an outer end rigidly connected to the bead finger 403 and an inner end pinned to the support flange 404, so that rotation of the bead clamp pivot 410 rotates the bead finger 403 about pin 408. Bead clamp pivot 410 has a distal end connected to arm 430. Arm 430 is pin connected to lower spider ring 208, which slides on center support outer column 220. Thus rotation of the lower bead area into the desired shape occurs during actuation of the arms 430 via sliding spider ring 208 pushed by pneumatic actuator 415.

Figure 8:
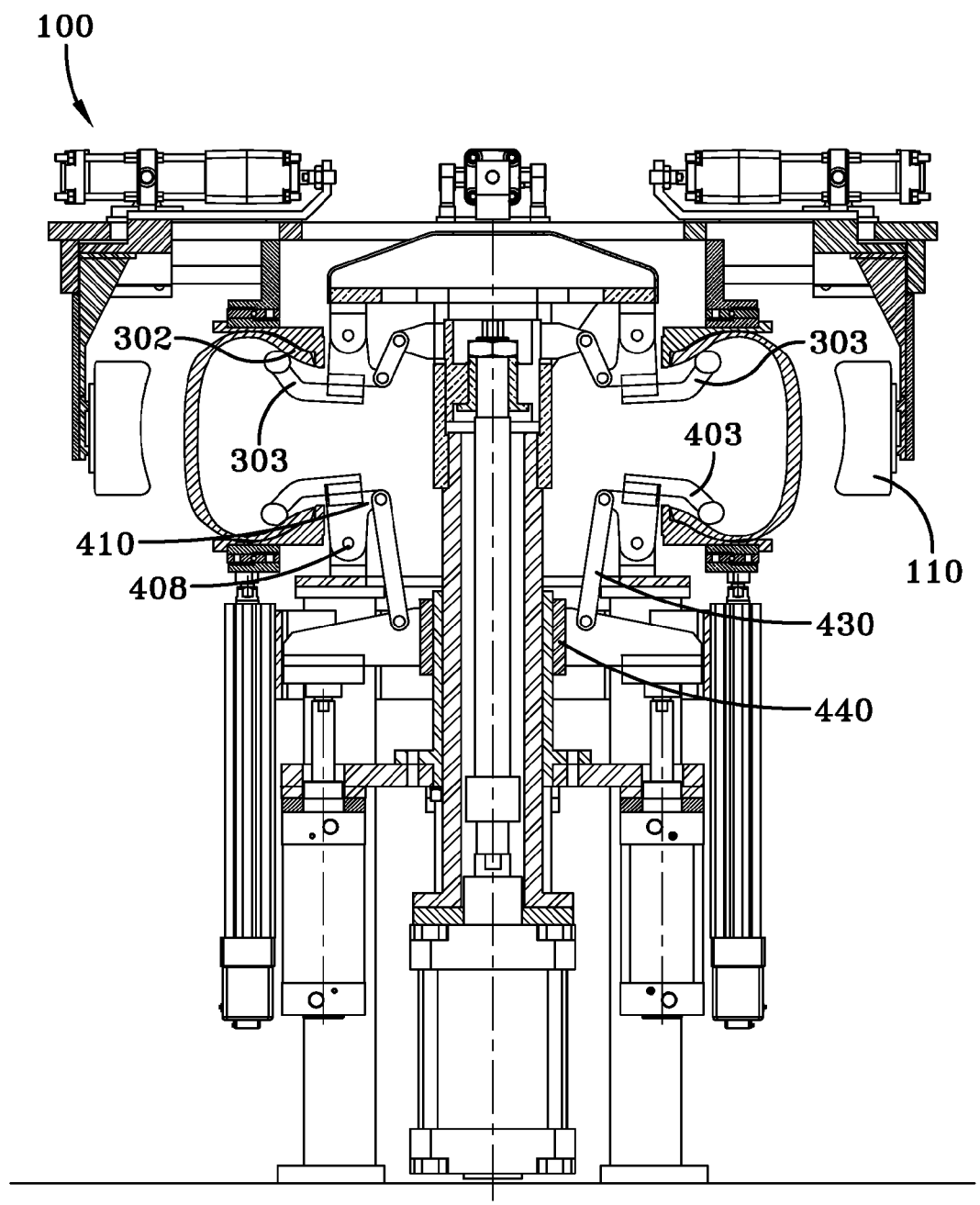
FIG. 8 is a cross sectional front view of a green tire preformer of the present invention shown in the actuated/clamped position, after rotating the bead area material around both the top and bottom beads but prior to the loader grasping the outside diameter of the green tire.

FIG. 8 illustrates the upper and lower bead clamps after being rotated into position so that the bead area components 302, 402 engage with the upper and lower bead rings 102, 230. This position is held for a period of time sufficient for the green tire to retain its shape, typically in the range of about 2 to about 10 minutes. The time may vary depending upon the particular tire size and components used. Next, the upper and lower bead clamps are unclamped, and the upper and lower bead support rings are rotationally indexed, and then the clamps are actuated. The above steps are repeated until the green tire has rotated a complete circle.

Figure 9:
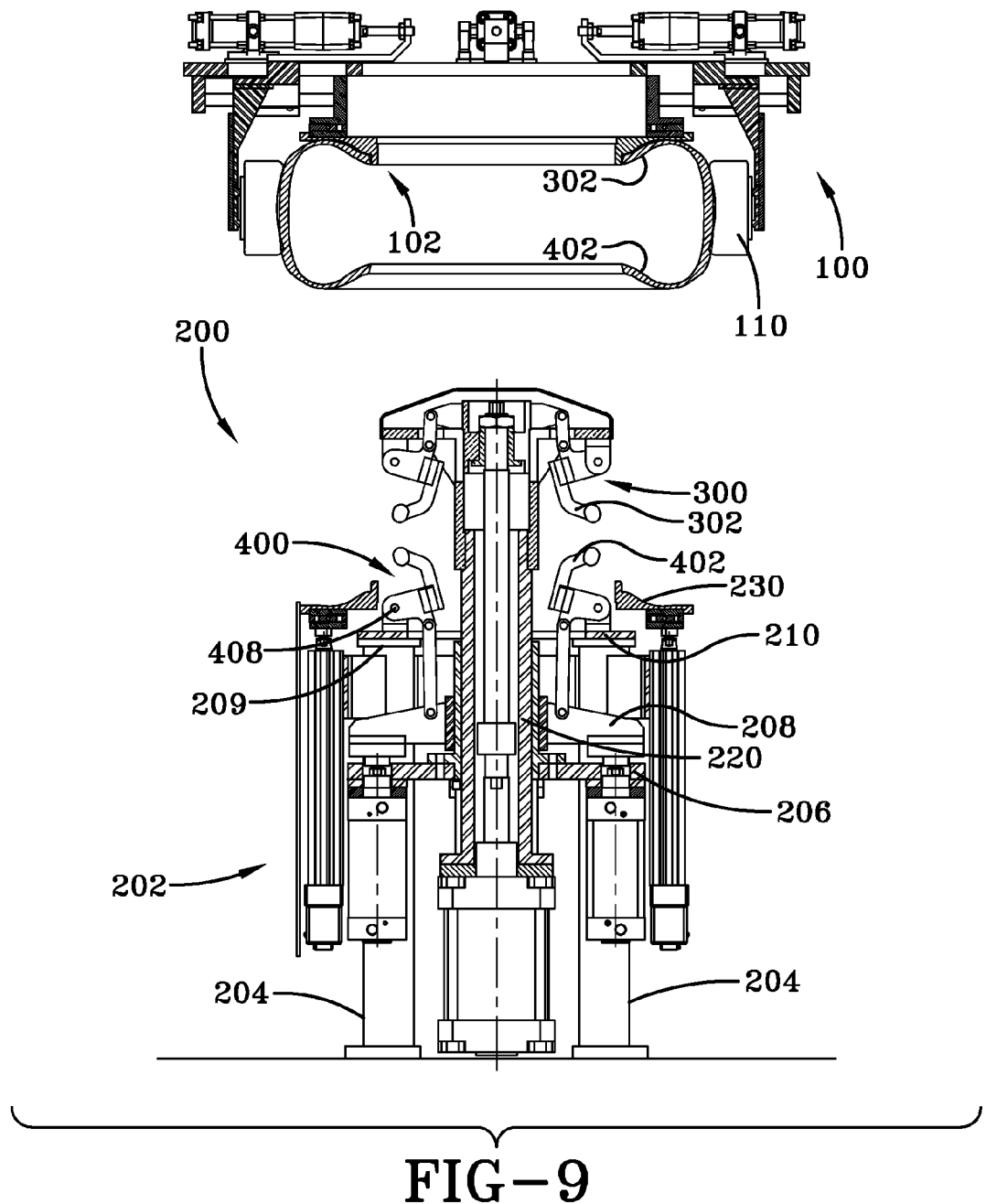
FIG. 9 is a cross sectional front view of a green tire preformer of the present invention shown with both bead areas rotated and the green tire grasped in the loader for transport.

FIG. 9 illustrates the green tire loaded in the loader 100 after removal from the pre-former 200. The loader 100 grips the outer radial surface of the tread region of the green tire. The upper bead area of the green tire is still in engagement with the rotatable upper bead ring support 102 to ensure the bead area 302 remains concentric to the bead center and supported during entry of the curing bladder at shaping.

The green tire loader 100 has been designed to engage the tire without negatively affecting lower bead area rotation or bead concentricity and parallelism. The tire loader 100 has several features built in to enhance uniformity. First when grasping the green tire for transport to the press, the loader 100 tire chucks grip only the crown of the outside of the tread area. Prior art loaders grasp the inside of the top bead that would cause a negative rotation of the material around the top bead. Typical prior art loader fingers do not address concentricity of either the top or bottom bead, so as a result parallelism of the two beads is also at risk. The loader 100 maintains the centering of the bottom bead by using multiple independently lockable cylinders to grasp the tread crown without distorting the upper and lower bead center to tread relationship. Finally the loader 100 contains the top bead ring support that maintains rotation, concentricity, and parallelism, during curing bladder shaping, and the transfer of the green tire to the curing press.

Figure 10A:
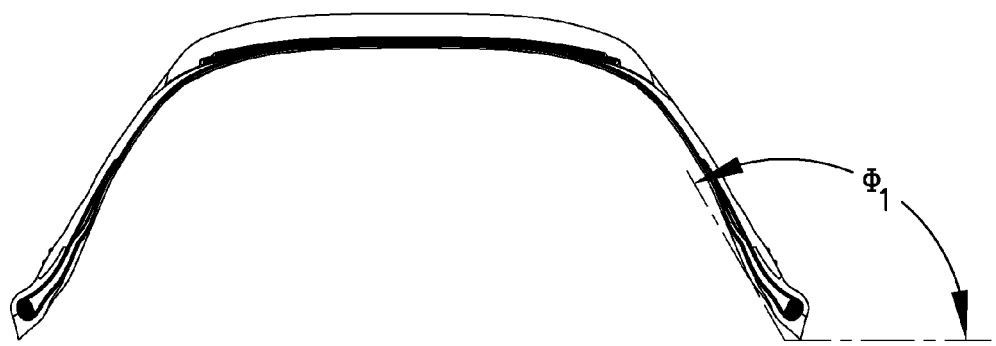
FIG. 10a illustrates the green tire prior to shaping or lower bead area rotation.
Figure 10B:
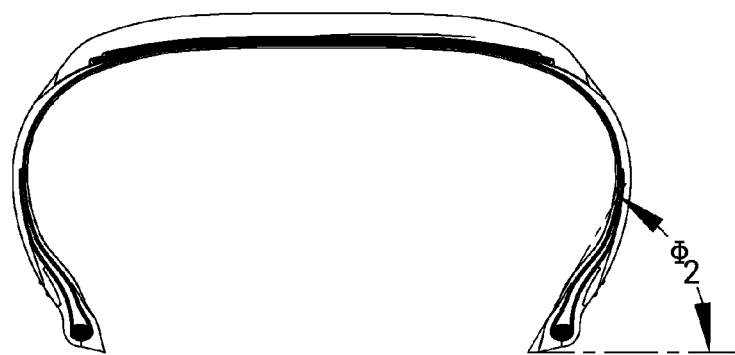
FIG. 10b illustrates the green tire after upper and lower bead area rotation, but prior to shaping.

FIG. 10*a* illustrates a typical green tire prior to being shaped. The bead areas of the green tire have a reverse curvature as compared to the green tire of FIG. 10*b*. In FIG. 10*b*, the beads are located axially inward of the tread shoulders, as compared to FIG. 10*a* in which the beads are located axially outward of the tread shoulders. The lower sidewall of FIG. 10*a* has angle of about 120 degrees with the axis of rotation, while the lower sidewall of FIG. 10*b*, which is more consistent to the cured tire position, has an angle of about 60 degrees.

While certain representative embodiments and details have been shown for the purpose of illustrating the invention, it will be apparent to those skilled in this art that the various changes and modifications may be made therein without departing from the spirit or scope of the invention.

What is claimed is:

1. A green tire preformer apparatus for rotating a first and second bead area into a cured position so that the first and second bead areas are in alignment with respect to each other, the green tire preformer apparatus comprising: a first support having a first bead support ring to support the first tire bead area of a green tire, and a second support having a second bead support ring positionable for engagement with the second tire bead area; and first and second rotatable bead clamps, wherein the first and second rotatable bead clamps are positioned to clamp the first and second bead areas into engagement with the first and second bead support rings, respectively, wherein the first support is rotatable.

2. The green tire preformer apparatus of claim 1 wherein the first and second supports are parallel to each other and spaced from one another by a defined distance.

3. The green tire preformer apparatus of claim 1 wherein the first support is translatable.

4. The green tire preformer apparatus of claim 1 wherein the second support is translatable.

5. The green tire preformer apparatus of claim 1 wherein the second support is mounted on a tire loader.

6. The green tire preformer apparatus of claim 1 wherein the first and second rotatable bead clamps comprises at least eight equally spaced rotatable bead clamps.

7. The green tire preformer apparatus of claim 1 wherein the rotatable bead clamps are L shaped.

8. The green tire preformer apparatus of claim 1 wherein the rotatable bead clamps have one or more fingers.

9. The green tire preformer apparatus of claim 8 wherein the fingers of the rotatable bead clamps are articulable.

10. The green tire preformer apparatus of claim 1 further comprising a centering mechanism.

11. The green tire preformer apparatus of claim 1 further comprising a tire loader positionable over the green tire preformer, said tire loader having a plurality of paddles positioned for grasping the outer portion of the green tire.

12. The green tire preformer apparatus of claim 1 wherein the tire bead support rings have a flat vertical component forming a lip.

13. The green tire preformer apparatus of claim 1 wherein the first tire bead support ring has an annular lip, wherein said annular lip has no taper.

14. The green tire preformer apparatus of claim 12 wherein the lip has no taper.

15. A green tire preformer apparatus for rotating a first and second bead of a green tire into a cured position and into alignment with respect to each other, the green tire having a first and second bead area, the green tire preformer apparatus comprising: a first support having a first bead support ring to support the first tire bead area of a green tire, and a second support having a second bead support ring positionable for engagement with the second tire bead area; and first and second rotatable bead clamps, wherein the first and second rotatable bead clamps are positioned to clamp the first and second bead areas into engagement with the first and second bead support rings, respectively, wherein the second support is rotatable.

* * * * *